United States Patent

Putt

[15] 3,699,561

[45] Oct. 17, 1972

[54] SHUNT ACTUATED FLUID LEVEL SENSOR

[72] Inventor: James Basil Putt, South Bend, Ind.

[73] Assignee: The Bendix Corporation

[22] Filed: May 24, 1971

[21] Appl. No.: 146,338

[52] U.S. Cl............340/244 E, 340/59, 340/244 B, 200/84 C
[51] Int. Cl. ............................................B60t 17/22
[58] Field of Search......340/244 E, 244 B, 244 R, 244 A; 200/84 C

[56] References Cited

UNITED STATES PATENTS 3,603,926 9/1971 Kimura..................340/244 A

Primary Examiner—Thomas B. Habecker
Attorney—William N. Antonis and Plante, Hartz, Smith & Thompson

[57] ABSTRACT

A fluid level sensor is disclosed for use in a vehicle master cylinder or other contained volume comprising a horizontally mounted reed switch connected to appropriate indicator circuitry for warning the vehicle operator of a low fluid condition. The switch is actuated by a unique eccentric float which carries a shunt disposed between a fixed magnet and the reed switch. As the float moves with the fluid level, the shunt likewise moves from a first position which permits the magnetic flux from the magnet to bypass the reed switch, to a second position in which its shunting effectiveness is removed and the magnetic flux of the magnet actuates the reed switch, which in turn energizes the indicator circuit.

7 Claims, 5 Drawing Figures

PATENTED OCT 17 1972 3,699,561
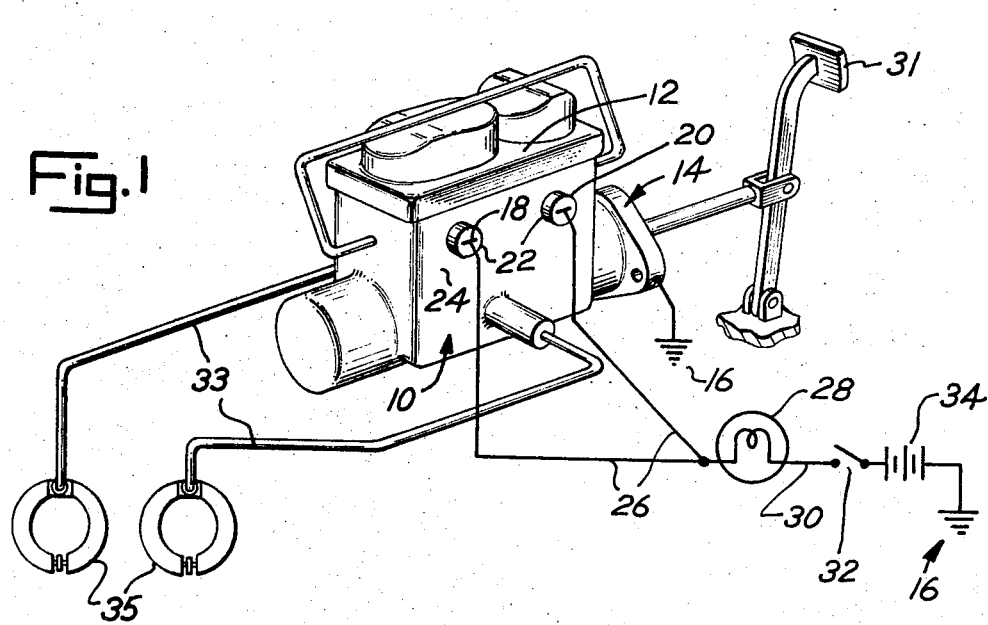
Fig.1
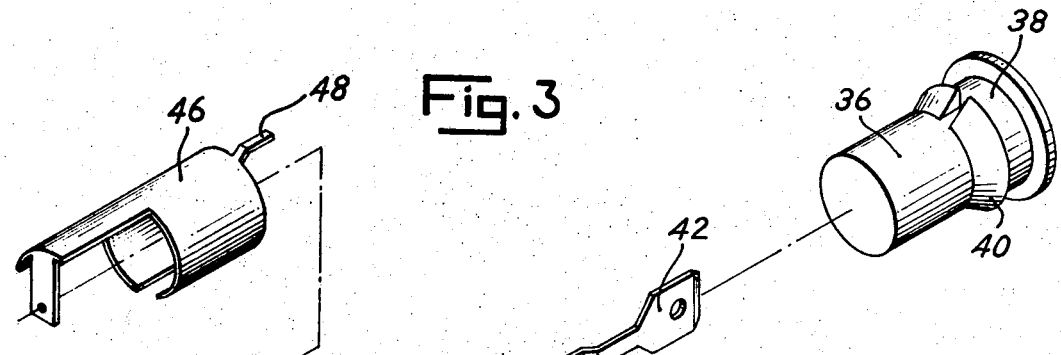
Fig.3
Fig.2
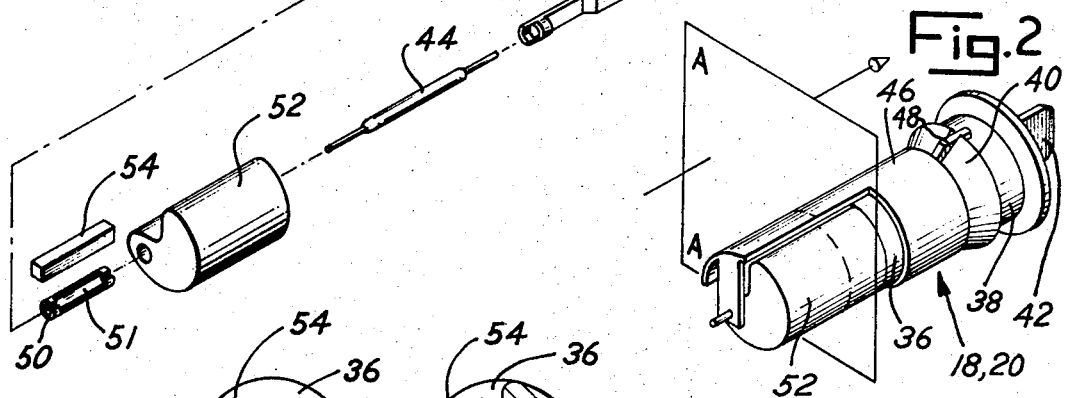
Fig.5   Fig.4
INVENTOR.
JAMES BASIL PUTT
BY
Plante Hartz Smith &
Thompson
ATTORNEYS 3,699,561

SHUNT ACTUATED FLUID LEVEL SENSOR

BACKGROUND OF THE INVENTION

Many devices have been conceived and developed for warning the driver of a motor vehicle of a dangerously low fluid level in the master cylinder reservoir for operating the brakes of a vehicle. Many of these devices are very cumbersome, complicated and expensive to manufacture and maintain.

Other devices subject the hydraulic fluid in the reservoir to an electrical potential, causing the fluid to decompose and corrosive by-products to be created in the reservoir. Others lack the reliability desired for warning the vehicle operator of fluid depletion caused by a leaky brake system prior to total failure.

Some of the earlier related fluid level indicators employed reed switches which were vertically mounted by insertion through the master cylinder cover. This created the attendant necessity of having a hole in the reservoir with sufficient clearance for permitting either the switch itself or the terminals of the switch to protrude therethrough thereby creating a leak path for brake fluid to the atmosphere and contaminants to the brake fluid.

Alternatively, the switch has been in certain instances permanently mounted in the reservoir cover, but this creates the condition of encumbering the cover so that removal of it for replenishment of the fluid or any other reason is rendered more difficult.

Additionally, these earlier devices often required a magnet having a generally circular shape with a hole through its center for acceptance of the reed switch probe. This annular permanent magnet which surrounds the reed switch probe on some of the switches is made of a very hard, brittle substance thus rendering machining of the material very difficult and consequently, very expensive to accomplish.

The present invention overcomes both these deficiencies in that the switch is horizontally mounted through an opening in the side of a master cylinder reservoir or other fluid reservoir so that it doesn't interfere with access to the reservoir and the magnet is formed into a simple, non-critical shape which is relatively easy to machine.

SUMMARY OF THE INVENTION

It is a primary object of this invention to provide a simplified warning device utilizing a hermetically sealed switch that is actuatable by movement of a shunt which shields the switch contacts from the flux field of a fixed magnet when the shunt is in a non-actuating position, but does not do so when the shunt is moved to an actuating position.

Another object is to provide a fluid level switch with a magnet having non-critical dimensions which is not difficult to machine.

Another object of the invention is to provide a warning switch assembly which is unobtrusively and inexpensively mounted by simply pressing the assembly into a pre-formed hole in the wall of a master cylinder reservoir Still another object is to provide a warning switch which does not carry a magnet in the float, thereby enabling a smaller float to be used which reduces the overall size of the switch and consequently, the manufacturing cost.

BRIEF DESCRIPTION OF THE DRAWINGS

FIG. 1 illustrates my warning switch assembly mounted in the side wall of a master cylinder hydraulic fluid reservoir with appurtenant electrical circuitry required to warn the vehicle operator of a low fluid condition.

FIG. 2 is a perspective view of the warning switch assembly shown in FIG. 1.

FIG. 3 is an exploded view of the warning switch assembly of FIG. 2 illustrating some of the components thereof.

FIGS. 4 and 5 are sectional views taken along plane A—A of FIG. 2 which illustrate the relationship of the float, shunt, magnet and reed switch in non-actuated and actuated positions.

DESCRIPTION OF THE PREFERRED EMBODIMENT

Referring now to FIG. 1, a vehicle master cylinder 10, having a fluid reservoir generally indicated at 12, is illustrated. The master cylinder 10 is mounted to the vehicle fire wall by utilizing mounting flange 14. This flange, when bolted to the vehicle, creates an electrical ground 16. My fluid level switches 18 and 20 are disposed horizontally through holes 22 in the wall 24 of reservoir 12. Appropriate leads 26 connect the switches 18 and 20 to an indicator 28 which is then connected by a second lead 30 to the vehicle ignition switch 32, the vehicle battery 34 and electrical ground 16.

The master cylinder 10 operates in a manner well known to those versed in the art (i.e. depression of pedal 31 causes pistons in master cylinder 10 to move displacing hydraulic fluid into front and rear brake systems 33 for actuating the brakes 35).

Referring to FIGS. 2–5, each fluid level switch 18 or 20 comprises a resilient probe 36 having a groove 38 around it for locating the switches 18 and 20 in the preformed holes 22 in the fluid reservoir wall 24. Shoulder 40 retains the switches 18 and 20 in the hole 22 once they have been pressed into place. Terminal blade 42 is connected at one end to reed switch capsule 44 and provides a male connection at the other end for the electrical circuitry associated with indicator 28. A brass sleeve or shell 46 is connected to the other end of the reed switch capsule 44 and provides a ground by means of finger 48 contacting the inside of hole 22 which then, in turn, is grounded at 16 through flange 14 to the vehicle. Sleeve 46 serves as: a support for the outer end of reed switch capsule 44, an electrical conduit from reed switch capsule 44 through finger 48 to the grounded reservoir wall 24 at holes 22, and as a fixed mounting for magnet 54. Shunt 50 (pressed inside float 52) and float 52 are movably carried on reed switch capsule 44. FIG. 4 illustrates the relative axial positions of reed switch 44, shunt 50, float 52 and magnet 54 when the switch is in a normal or non-actuated position and FIG. 5 illustrates the relative position of the same components in an actuated position. Shunt 50 has an opening 51 for admitting the flux from magnet 54 when the switch is in its actuated position.

MODE OF OPERATION OF THE PREFERRED EMBODIMENT

Each time the brakes 35 are applied by depression of pedal 31, hydraulic fluid is forced from the master cylinder under high pressure. If there are any leaks in the system 33, however minute, not all the fluid which was forced into the braking system 33 from the master cylinder 10 is restored to the master cylinder upon release of the brakes 35. The master cylinder is replenished from reservoir 12 each time the brakes 35 are released. Each fluid loss causes the hydraulic fluid level in the master cylinder reservoir 12 to drop with each successive brake application. Float 52, carrying shunt 50, follows the fluid level as it drops from a non-actuating position, as shown in FIG. 4 to an actuating position, as shown in FIG. 5. In the actuated position, the shunt 50 will have rotated sufficiently around reed switch capsule 44 so that the opening 51 thereof allows the flux from magnet 54 to operate the reed switch 44. The reed switch capsule 44, which contains a pair of thin blade contacts, forms no part of the present invention and is well known to those versed in the art both as to construction variations and function. When the reed switch capsule is actuated, a circuit is completed from the vehicle battery 34 through closed ignition switch 32, indicator 28 and reed switch 18 or 20 to ground 16. Thus, the vehicle operator is apprised of the fluid shortage so that the system can be repaired and the fluid replaced. As the fluid level is restored in reservoir 12, float 52 carrying shunt 50 rises with the fluid level thereby once again interposing the solid wall portion of shunt 50 between the reed switch capsule 44 and magnet 54 so that the warning indicator 28 is extinguished.

I claim:

1. In a master cylinder:
    a wall defining fluid reservoir means therewithin;
    a cover member for closing said reservoir means;
    magnetically actuatable switch means located in said wall;
    float means operatively connected to said switch means and adapted to follow the fluid level in said reservoir;
    signal means for indicating a predetermined fluid level in said reservoir means;
    electrical circuit means operatively connecting said signal means with said switch means;
    magnetic means for actuating said switch means; and
    shunt means fixedly connected to said float means and interposed between said magnetic means and said switch means, said shunt means having a first position for preventing actuation of said switch means by the magnetic flux from said magnetic means and a second position for permitting actuation of said switch means by said magnetic flux;
    said float means causing said shunt means to move from said first position to said second position as the fluid level in said reservoir decreases.

2. The invention of claim 1 wherein said shunt means comprises:
    a movable sleeve which surrounds said switch means, said sleeve having an opening therein for permitting said magnetic flux to actuate said switch means when said sleeve is moved to said second position by said float means.

3. The invention of claim 2 wherein said float means includes an axial hole extending therethrough:
    said axial hole providing a pivot for said float; and
    a mounting for said shunt sleeve.

4. The invention of claim 3 wherein said switch means is connected to grounding means:
    said grounding means being comprised of a hollow cylindrical shell having a grounding finger extending from one end thereof for contacting said wall and a section extending from the other end thereof, said section including an arm for supporting said switch means.

5. The invention of claim 4 wherein:
    said float means is a cylindrically shaped eccentric with a portion thereof removed for receiving said magnetic means.

6. The invention of claim 5 wherein the axial hole containing said shunt sleeve is located in a quarter round section of said cylindrically shaped eccentric.

7. The invention of claim 6 wherein the portion removed from said cylindrically shaped eccentric is substantially a quarter round section adjacent the quarter round section containing said shunt sleeve.

* * * * *